United States Patent [19]
Kenworthy

[11] Patent Number: 5,691,978
[45] Date of Patent: Nov. 25, 1997

[54] SELF-CANCELLING FULL-DUPLEX RF COMMUNICATION SYSTEM

[75] Inventor: Gary Robert Kenworthy, Pleasanton, Calif.

[73] Assignee: Signal Science, Inc., Santa Clara, Calif.

[21] Appl. No.: 786,197

[22] Filed: Jan. 21, 1997

Related U.S. Application Data

[63] Continuation of Ser. No. 418,679, Apr. 7, 1995, abandoned.

[51] Int. Cl.[6] .................................................. H04B 3/23
[52] U.S. Cl. ..................... 370/278; 370/289; 370/291; 379/411; 455/296
[58] Field of Search .............................. 370/276, 277, 370/278, 279, 282, 286, 287, 288, 289, 290, 291; 379/219, 346, 350, 406, 410, 411; 375/230, 232; 455/67.3, 296, 307, 541

[56] References Cited

U.S. PATENT DOCUMENTS

| | | | |
|---|---|---|---|
| 4,298,873 | 11/1981 | Roberts | 343/854 |
| 4,520,475 | 5/1985 | Berg | 370/32 |
| 4,570,036 | 2/1986 | Virdee | 370/32.1 |
| 4,835,765 | 5/1989 | Bergmans | 370/32.1 |
| 4,868,874 | 9/1989 | Takatori et al. | 370/32.1 |
| 4,918,685 | 4/1990 | Tol et al. | 370/32.1 |
| 4,952,193 | 8/1990 | Talwar | 455/63 |
| 4,991,165 | 2/1991 | Cronyn | 370/32 |
| 5,136,576 | 8/1992 | Brownlie | 370/31 |
| 5,289,459 | 2/1994 | Brownlie | 370/24 |
| 5,313,498 | 5/1994 | Sano | 370/32.1 |
| 5,331,503 | 7/1994 | Kokubo et al. | 370/32.1 |
| 5,400,394 | 3/1995 | Raman et al. | 370/32.1 |

OTHER PUBLICATIONS

Lee, Edward A., "Digital Communication", pp. 133–135, 587–591 and 642–643 (1988).

*Primary Examiner*—Alpus H. Hsu
*Assistant Examiner*—Seema S. Rao
*Attorney, Agent, or Firm*—Burns, Doane, Swecker & Mathis, LLP

[57] ABSTRACT

A method is presented herein whereby both transceivers of a full-duplex RF communications system can use the same spectrum at the same time. Self-interference is cancelled using a combination of antenna placement, analog RF suppression, and digital adaptive filtering. The details of this self-cancelling technique are presented.

19 Claims, 5 Drawing Sheets

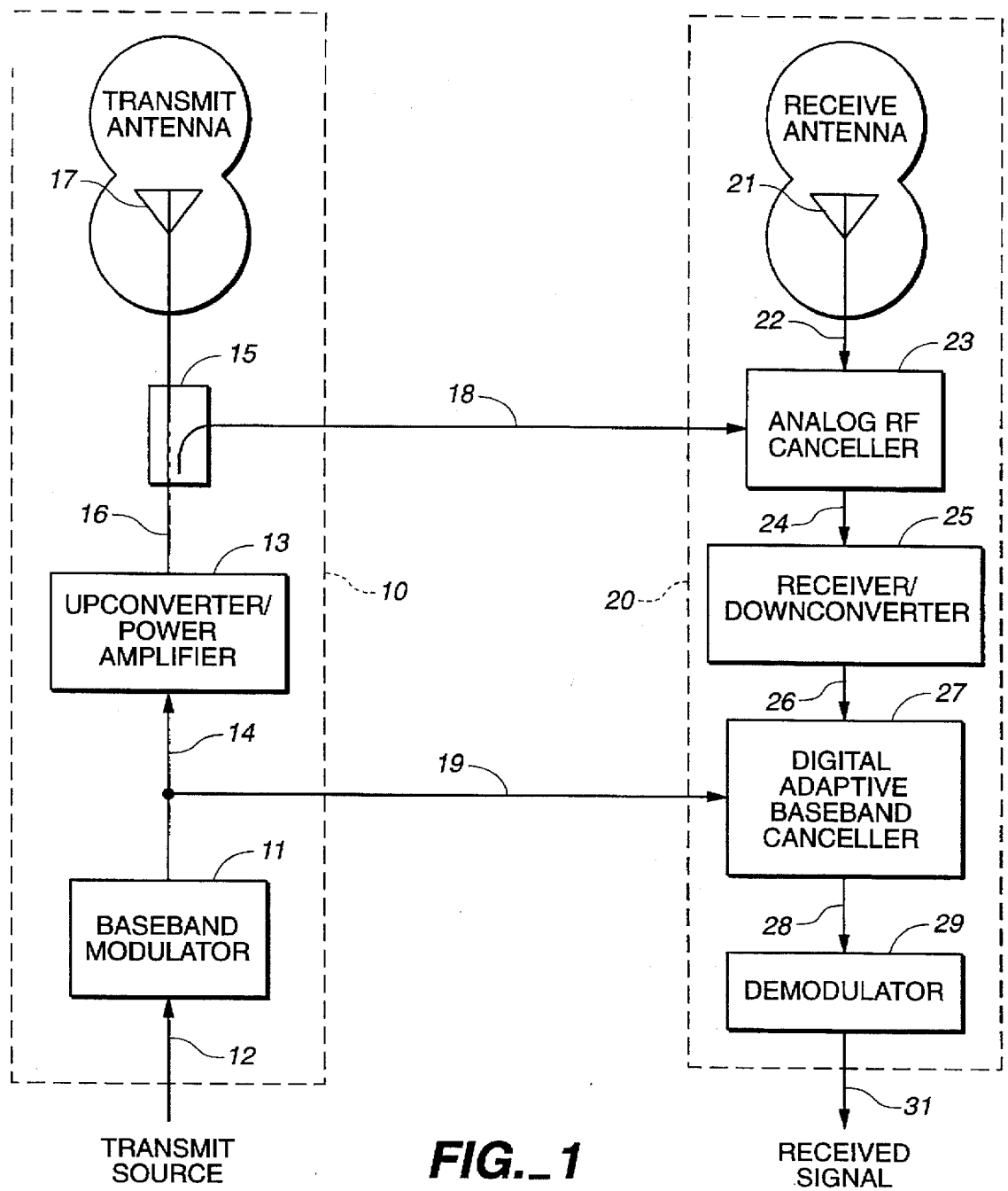
FIG._1

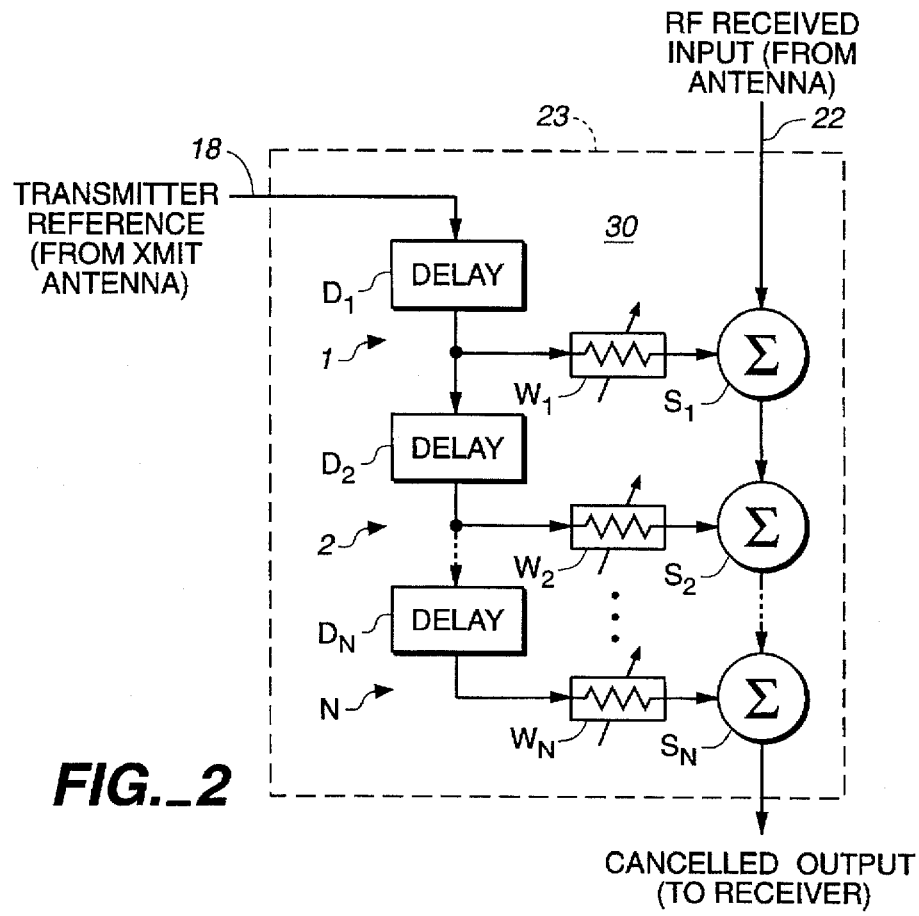
FIG._2
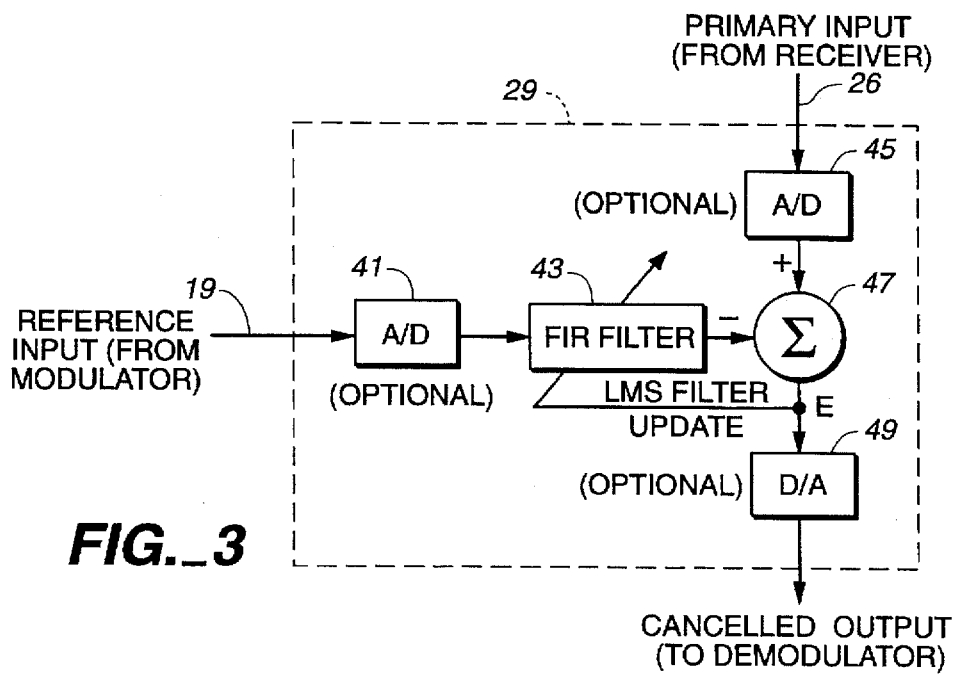
FIG._3

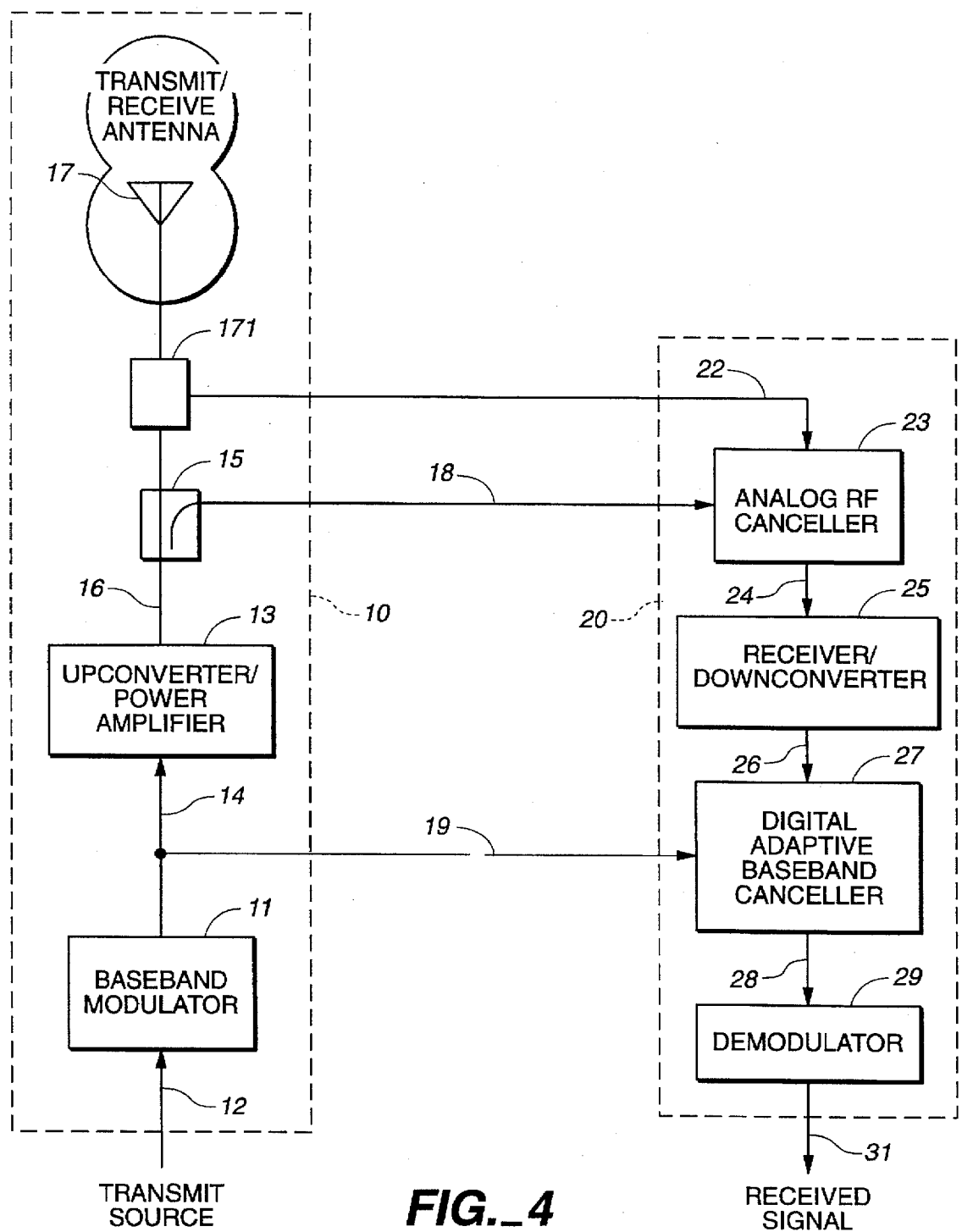
FIG._4

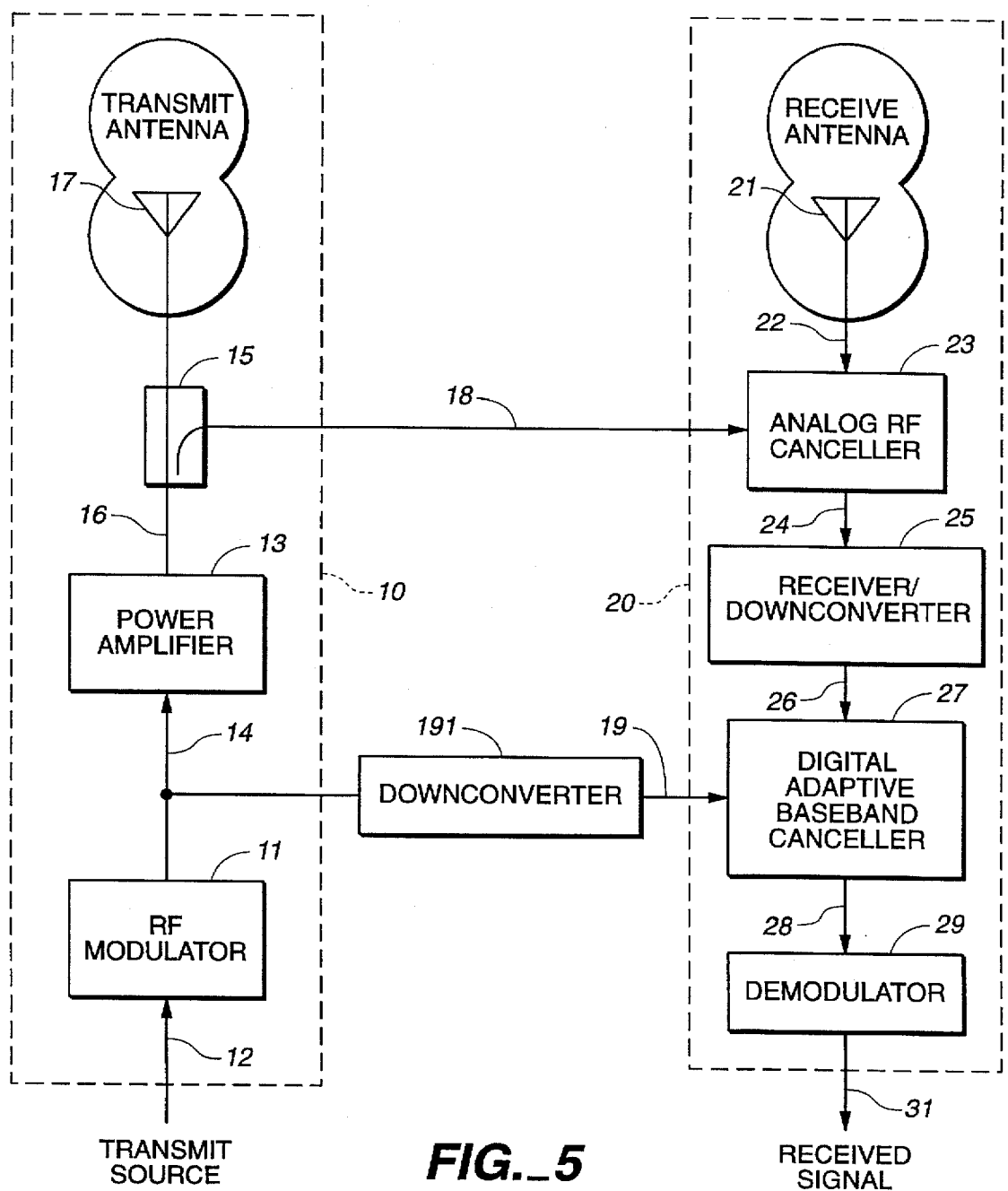
FIG._5

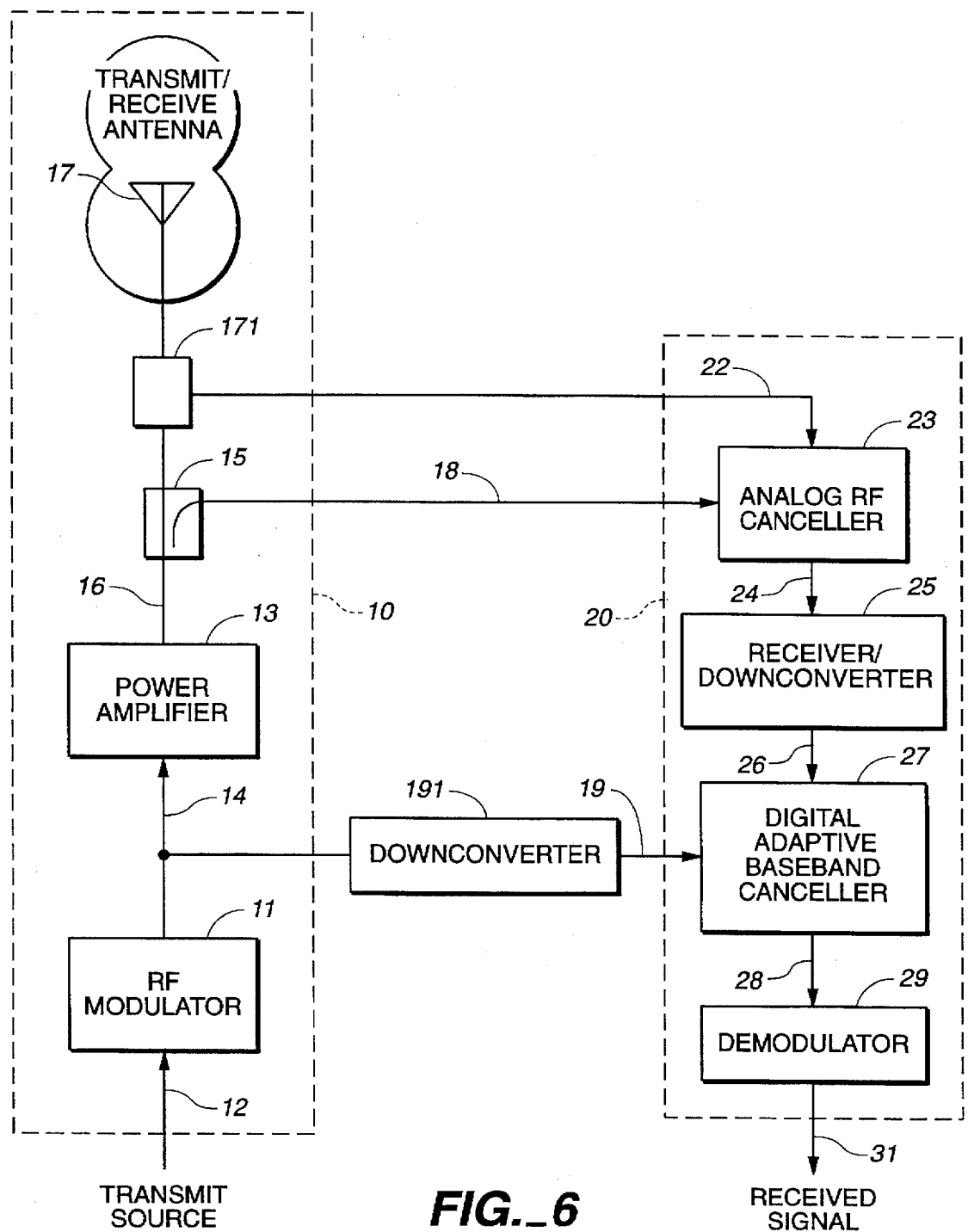
FIG._6

SELF-CANCELLING FULL-DUPLEX RF COMMUNICATION SYSTEM

This application is a continuation of application Ser. No. 08/418,679, filed Apr. 7, 1995, now abandoned.

BACKGROUND OF THE INVENTION

1. Field of the Invention

The present invention relates to full-duplex RF communication systems, more particularly to the cancellation of unwanted signals within such systems.

2. State of the Art

A two-way RF communication system is one in which signals are transmitted bi-directionally between two transceivers. In such a system, some means must be provided to allow the receiver of each transceiver to receive the signal from the opposite transmitter without interference from its own transmitter. The two primary means for preventing self-interference are time-domain multiplexing (TDM) and frequency-domain multiplexing (FDM).

One popular example of a TDM method of separating the transmit signal from the receive signal is a push-to-talk system. In this scheme, each transceiver normally operates as a receiver with its transmitter off. When one party desires to transmit, the operator keys the transmitter while talking. When the transceiver is transmitting, no attempt to receive is made. As such, each transmitter operates in a half-duplex, or one way, mode at any given time. Only one transceiver at a time is transmitting. The obvious disadvantage of this technique is that total throughput of the system is decreased since only one transmitter can transmit at any given time.

In FDM, each transmitter is assigned an independent carrier center frequency. For two transceivers A and B, transceiver A will transmit on center frequency channel F1 and receive on frequency F2, while transceiver B will transmit on F2 and receive on F1. The frequency channels F1 and F2 are separated enough in frequency that their modulated spectra do not overlap, and each receiver may be tuned such that it will receive the intended frequency and reject its own transmitted signal. In this technique, both transceivers can be transmitting simultaneously, but twice the RF bandwidth is required. The cellular telephone system is an example of an FDM system. The cellular base station transmitter frequency is commonly offset from the mobile phone transmitter frequency by 45 MHz.

There exists a need for a full-duplex RF communications techniques that is both bandwidth-efficient and that maintains high throughput. The present invention addresses this need.

SUMMARY OF THE INVENTION

A method is presented herein whereby both transceivers of a full-duplex RF communications system can use the same spectrum at the same time. Self-interference is cancelled using a combination of antenna placement, analog RF suppression, and digital adaptive filtering. The details of this self-cancelling technique are presented in the following description.

BRIEF DESCRIPTION OF THE DRAWING

The present invention may be further understood from the following description in conjunction with the appended drawing. In the drawing:

FIG. 1 is a block diagram of a self-cancelling, full-duplex RF communications system in accordance with one embodiment of the present invention;

FIG. 2 is a more detailed block diagram of the analog RF canceller of FIG. 1; and FIG. 3 is a more detailed block diagram of the baseband digital adaptive filter of FIG. 1;

FIG. 4 is a block diagram of a self-cancelling, full-duplex RF communications system in accordance with another embodiment of the present invention;

FIG. 5 is a block diagram of a self-cancelling, full-duplex RF communications system in accordance with a further embodiment of the present invention; and FIG. 6 is a block diagram of a self-cancelling, full-duplex RF communications system in accordance with still another embodiment of the present invention.

DETAILED DESCRIPTION OF THE PREFERRED EMBODIMENTS

The present serf-cancelling full-duplex RF system uses a combination of one or more of the following techniques to achieve self-cancellation: (1) antenna positioning and pointing to minimize transmission and inductive coupling between the transmit antenna and the receive antenna; (2) use of an analog RF canceller (delay and amplitude matching signal suppressor) to subtract as much of the self transmitted signal from the receive antenna signal as possible to preserve the dynamic range of the signal during subsequent digital processing; and (3) use of a digital adaptive canceler operating at the baseband frequency to cancel dynamic (non-stationary) coupled transmissions caused by moving reflectors (such as vehicles) or by drifting performance of the transceiver components.

Referring to FIG. 1, the present self-cancelling, full-duplex RF communications system includes a transmitter portion 10 and a receiver portion 20. In the transmitter portion of the system, a signal from a transmit source (not shown) is input to a conventional modulator 11 to produce a modulated signal 14. The modulated signal 14 is input to an upconverter/power amplifier 13 to produce an amplified modulated signal 16 at the transmit frequency. The modulated signal is also input to the receiver portion 20. A portion of the amplified modulated signal 16 is split off in a power splitter 15 and input to the receiver portion 20. The bulk of the signal, however, is input to a transmit antenna 17 and radiated as RF energy.

In the receiver portion of the system, a radiated RF signal is picked up by a receive antenna 21 to produce a received signal 22. The received signal 22 is input to an analog RF canceller 23. A signal 18 from the signal splitter 15 is also input to the analog RF canceller 23, which subtracts as much of the self transmitted signal from the receive antenna signal as possible. The resulting signal 24 is then input to a conventional receiver/downconverter 25, which receives the signal of interest and converts that signal to a baseband signal 26. The baseband signal 26 is input to a digital adaptive baseband canceller 27. A signal 19 from the modulator is also input to the digital adaptive baseband canceller 27, which cancels dynamic (non-stationary) coupled transmissions caused by moving reflectors (such as vehicles) or by drifting performance of the transceiver components. The digital adaptive baseband canceller 27 produces a signal 28 in which energy from the self-transmitted signal has been substantially cancelled. The self-cancelled signal 28 is input to a conventional demodulator 29, where it is demodulated to produce a received signal 31.

By strategically placing the transmit antenna 17 and the receive antenna 21, the amount of active self-cancellation to be performed may be significantly reduced. Antenna positioning has as its main purpose to minimize the direct RF coupling between the transmit and receive antennas. A secondary purpose is to minimize near-field reflections of the transmitted signal to the receive antenna. One or more of the following techniques can be used, depending on the specific application:

a. positioning the receive antenna in a null of the transmit antenna pattern, and, likewise, the transmit antenna in a null of the receive antenna pattern, b. separating the transmit and receive antennas by as much physical distance as practical, c. positioning the transmit and receive cable runs and antennas to minimize inductive coupling, d. minimizing near field reflections by antenna positioning, mast construction, and appropriate coating or shielding of major reflecting objects.

Direct RF coupling between the transmit and receive antennas having been minimized by antenna positioning and installation, further suppression, if required, may be performed by analog RF cancellation. The main objective of analog RF cancellation is to subtract as much of the self transmitted signal from the receive antenna signal as possible, thereby preserving the dynamic range of the signal during subsequent digital processing. This suppression is accomplished using the analog RF canceller 23, consisting of a analog tapped delay line of one or more stages, as shown in FIG. 2.

Referring to FIG. 2, each segment 1, 2, . . . , N of the tapped delay line 30 consists of a delay element D, an amplitude and phase-matching tap W, and an analog summing junction S. The taps may be fixed, adjustable, or automatically adapting. (In cases where sufficient suppression is accomplished by antenna positioning, this RF cancellation step may not be necessary.)

Most of the direct and stationary reflected energy coupled from the transmit antenna to the receive antenna is cancelled by the techniques (1) and (2) described above. If necessary, baseband digital adaptive filtering may also be performed to achieve greater suppression. The purpose of this final step is to cancel dynamic (non-stationary) coupled transmissions caused by moving reflectors (such as vehicles) or by drifting performance of the transceiver components. Referring again to FIG. 1, the signal from the receive antenna is passed through the receiver 25 and downconverted to either in-phase and quadrature phase (I&Q) baseband data, or a low frequency intermediate frequency (IF) suitable for digital processing. The received signal 26, which may have undesirable residual transmitted signal coupled in it, is digitized and provided as the primary input to the digital adaptive baseband canceller 27, also referred to as the baseband digital adaptive filter. The baseband digital adaptive filter is shown in FIG. 3.

Referring to FIG. 3, the reference input 19 of the transmitted signal, from the transmit baseband section or, alternatively, through a receiver, is provided to the adaptive filter reference input. The adaptive filter 29 will adapt to minimize the energy in the error output, producing a received signal with transmitter components attenuated.

More particularly, the reference input 19 (after being converted to a digital signal in an A/D converter 41, if necessary) is input to an FIR filter 43. The coefficients of the FIR filter are updated, continuously or at intervals, using, for example, a least-mean-squares (LMS) algorithm. A digital output signal of the FIR filter 43 is subtracted from the primary input 26 from the receiver (after being converted to a digital signal in an A/D converter 45, if necessary) in a digital subtracter 47 to produce a signal E. The adaptive filter attempts to minimize the signal E. When the signal E has been minimized, the remaining signal will be attributable almost solely to the received signal and not to the transmitted signal. The signal E is may then be converted back to analog, if desired, using a D/A converter 49. The resulting self-cancelled output signal may then be input to a conventional demodulator for demodulation.

The receive antenna collects signal from the desired source (signal-of-interest, or SOI) plus self-interference from the transmitter (signal-not-of-interest, or SNOI). The object of the self-cancellation system is to attenuate the SNOI to a level which is low enough that the SOI can be adequately demodulated. The following example demonstrates a method which can be used to determine the amount of cancellation required.

Assume that SOI transmit power=SNOI transmit power. Assume further that the SOI transmit antenna is located 1 km from the receive antenna, and that the SNOI transmit antenna is located 10m from the receive antenna. This distance ratio will result in the SNOI being 40 dB greater than the SOI at the receive antenna.

For this example, the SOI transmit antenna is 100 times further than the SNOI transmit antenna from the receive antenna. If the ratio of SOI/SNOI required for satisfactory demodulator operation is 10 dB, then the cancellation system must provide 50 db of cancellation (40 dB to overcome the different in signal strengths based on the difference in distance, plus 10 dB for the SOI/SNOI ratio requirement).

This 50 dB can be allocated as practical among the three cancellation steps. One possible allocation is:

Step 1: Antenna Placement (in mutual 10 dB null): 20 dB.
Step 2: Analog Cancellation: 15 dB.
Step 3: Digital Adaptive Cancellation: 25 dB.
Total Cancellation: 60 dB.

The foregoing figures, achievable in practice without great difficulty, result in total cancellation of 60 dB. This total exceeds the 50 dB requirement by 10 dB.

In some instances, sufficient cancellation may be obtained using Steps 2 and 3 only. A single transmit/receive antenna may then be used. Other particulars of the system may also vary, as illustrated in the embodiments of FIG. 4, FIG. 5, and FIG. 6.

Referring to FIG. 4, the separate receive antenna of FIG. 1 has been omitted. Instead, the analog RF canceller 23 is connected to a single transmit/receive antenna 17 through a directional coupler 171. Such an arrangement may find application, for example, in the case of short-range communications systems, for example a building-to-building communications system.

Referring to FIG. 5, separate transmit and receive antennas 17 and 21 are employed. The modulator 11, however, instead of being a baseband modulator, is shown as being an RF modulator. An additional downconverter 191 is then used to convert the RF-modulated signal back down to baseband for use by the digital adaptive baseband canceller 27.

The self-cancelling, full-duplex RF communications system of FIG. 6 combines the features of FIG. 4 and FIG. 5. That is, the analog RF canceller 23 is connected to a single transmit/receive antenna 17 through a directional coupler 171. Furthermore, the modulator 11 is an RF modulator. The downconverter 191 converts the RF-modulated signal back down to baseband for use by the digital adaptive baseband canceller 27. Numerous other variations will also be apparent to one of ordinary skill in the art.

It will therefore be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A full-duplex radio communications system comprising a first transceiver that transmits a first signal of a predetermined frequency and a second transceiver that transmits a second signal of substantially said predetermined frequency, the first signal being a desired signal of the second transceiver and the second signal being a desired signal of the first transceiver, wherein at a particular instant of time both the first signal and the second signal are being transmitted, at least one of the first transceiver and the second transceiver comprising:

a modulator responsive to one of said first and second signals to be transmitted for producing a modulated signal;

means responsive to said modulated signal for producing an amplified signal of substantially said predetermined frequency;

a transmit antenna coupled to said amplified signal for radiating said amplified signal in a radiation pattern;

a receive antenna for picking up a radiated signal and producing in response thereto a picked-up signal, said receive antenna being positioned in at least a local minimum of said radiation pattern;

means responsive to said picked-up signal for selectively receiving a portion of said picked-up signal of substantially said predetermined frequency and for producing an intermediate signal; and a demodulator responsive to said intermediate signal for producing the other of said first and second signals.

2. A full-duplex radio communications system comprising a first transceiver that transmits a first signal of a predetermined frequency and a second transceiver that transmits a second signal of substantially said predetermined frequency, the first signal being a desired signal of the second transceiver and the second signal being a desired signal of the first transceiver, wherein at a particular instant of time both the first signal and the second signal are being transmitted, at least one of the first transceiver and the second transceiver comprising:

a modulator responsive to one of said first and second signals to be transmitted for producing a modulated signal;

means responsive to said modulated signal for producing an amplified signal of substantially said predetermined frequency;

a power splitter responsive to said amplified signal for producing a transmit signal and a reference signal;

a transmit antenna coupled to said transmit signal for radiating said transmit signal in a radiation pattern;

a receive antenna for picking up a radiated signal and producing in response thereto a picked-up signal, said receive antenna being positioned in at least a local minimum of said radiation pattern;

an analog RF canceller responsive to said picked-up signal and said reference signal for cancelling from said picked-up signal energy attributable to said transmit signal to produce an at least partially self-cancelled signal;

means responsive to said at least partially self-cancelled signal for selectively receiving a portion of said at least partially self-cancelled signal of substantially said predetermined frequency and for producing an intermediate signal; and a demodulator responsive to said intermediate signal for producing the other of said first and second signals.

3. A full-duplex radio communications transceiver comprising:

a modulator responsive to a first information signal to be transmitted for producing a modulated signal;

means responsive to said modulated signal for producing an amplified signal of a predetermined frequency;

a power splitter responsive to said amplified signal for producing a transmit signal and a reference signal;

a transmit antenna coupled to said transmit signal for radiating said transmit signal in a radiation pattern;

a receive antenna for picking up a radiated signal and producing in response thereto a picked-up signal, said receive antenna being positioned in at least a local minimum of said radiation pattern;

an analog RF canceller responsive to said picked-up signal and said reference signal for cancelling from said picked-up signal energy attributable to said transmit signal to produce a first self-cancelled signal;

means responsive to said first self-cancelled signal for selectively receiving a portion of said first self-cancelled signal of substantially said predetermined frequency and for producing an intermediate signal;

means responsive to said intermediate signal and said modulated signal for cancelling from said intermediate signal further energy attributable to said transmit signal to produce a second self-cancelled signal; and a demodulator responsive to said second self-cancelled signal for producing a second information signal.

4. The apparatus of claim 3, wherein said modulator is a baseband modulator.

5. The apparatus of claim 4, wherein said means for producing an amplified signal comprises a upconverter/power amplifier.

6. The apparatus of claim 3, wherein said modulator is an RF modulator.

7. The apparatus of claim 6, wherein said means for producing an amplified signal comprises an power amplifier.

8. The apparatus of claim 6, wherein said means for cancelling comprises a downconverter and an adaptive filter.

9. A full-duplex radio communications system comprising a first transceiver that transmits a first signal of a predetermined frequency and a second transceiver that transmits a second signal of substantially said predetermined frequency, the first signal being a desired signal of the second transceiver and the second signal being a desired signal of the first transceiver, wherein at a particular instant of time both the first signal and the second signal are being transmitted, at least one of the first transceiver and the second transceiver comprising:

a modulator responsive to one of said first and second signals to be transmitted for producing a modulated signal;

means responsive to said modulated signal for producing an amplified signal of substantially said predetermined frequency;

a power splitter responsive to said amplified signal for producing a transmit signal and a reference signal;

a directional coupler coupled to said transmit signal;

a transmit/receive antenna coupled to said directional coupler for radiating said transmit signal in a radiation pattern and for picking up a radiated signal and producing in response thereto a picked-up signal, said directional coupler producing a receive signal in response to said picked-up signal;

an analog RF canceller responsive to said receive signal and said reference signal for cancelling from said receive signal energy attributable to said transmit signal to produce an at least partially self-cancelled signal;

means responsive to said at least partially self-cancelled signal for selectively receiving a portion of said at least partially self-cancelled signal of substantially said predetermined frequency and for producing an intermediate signal; and a demodulator responsive to said intermediate signal for producing the other of said first and second signals.

10. A full-duplex radio communications transceiver comprising:

a modulator responsive to a first information signal to be transmitted for producing a modulated signal;

means responsive to said modulated signal for producing an amplified signal of a predetermined frequency;

a power splitter responsive to said amplified signal for producing a transmit signal and a reference signal;

a directional coupler coupled to said transmit signal;

a transmit/receive antenna coupled to said directional coupler for radiating said transmit signal in a radiation pattern and for picking up a radiated signal and producing in response thereto a picked-up signal, said directional coupler producing a receive signal in response to said picked-up signal;

an analog RF canceller responsive to said receive signal and said reference signal for cancelling from said receive signal energy attributable to said transmit signal to produce a first self-cancelled signal;

means responsive to said first self-cancelled signal for selectively receiving a portion of said first self-cancelled signal of substantially said predetermined frequency and for producing an intermediate signal;

means responsive to said intermediate signal and said modulated signal for cancelling from said intermediate signal further energy attributable to said transmit signal to produce a second self-cancelled signal; and a demodulator responsive to said second self-cancelled signal for producing a second information signal.

11. In a full-duplex radio communications system comprising a first transceiver that transmits a first signal of a predetermined frequency and a second transceiver that transmits a second signal of substantially said predetermined frequency, the first signal being a desired signal of the second transceiver and the second signal being a desired signal of the first transceiver, wherein at a particular instant of time both the first signal and the second signal are being transmitted, a method of performing full-duplex communications over a single communications channel, comprising the steps of, at at least one of said first transceiver and said second transceiver:

positioning a receive antenna in at least a local minimum of a known radiation pattern;

during transmission:
modulating one of said first and second signals to be transmitted to produce a modulated signal;
processing said modulated signal to produce an amplified signal of a predetermined frequency; and
radiating said amplified signal in said known radiation pattern;

during reception, concurrent with said transmission:
picking up a radiated signal and producing in response thereto a picked-up signal;
selectively receiving a portion of said picked-up signal of substantially said predetermined frequency and producing an intermediate signal; and
demodulating said intermediate signal to produce the other of said first and second signals.

12. In a full-duplex radio communications system comprising a first transceiver that transmits a first signal of a predetermined frequency and a second transceiver that transmits a second signal of substantially said predetermined frequency, the first signal being a desired signal of the second transceiver and the second signal being a desired signal of the first transceiver, wherein at a particular instant of time both the first signal and the second signal are being transmitted, a method of performing full-duplex communications over a single communications channel, comprising the steps of, at at least one of said first transceiver and said second transceiver:

positioning a receive antenna in at least a local minimum of a known radiation pattern;

during transmission:
modulating one of said first and second signals to be transmitted to produce a modulated signal;
processing said modulated signal to produce an amplified signal of a predetermined frequency;
splitting said amplified signal to produce a transmit signal and a reference signal; and
radiating said transmit signal in said known radiation pattern;

during reception, concurrent with said transmission:
picking up a radiated signal and producing in response thereto a picked-up signal;
inputting said picked-up signal and said reference signal to an RF canceller and using said RF canceller to cancel from said picked-up signal energy attributable to said transmit signal to produce an at least partially self-cancelled signal;
selectively receiving a portion of said at least partially self-cancelled signal of substantially said predetermined frequency and producing an intermediate signal; and
demodulating said intermediate signal to produce the other of said first and second signals.

13. In a radio communications transceiver having a receive antenna, an analog RF canceller, and an adaptive filter, a method of performing full-duplex communications over a single communications channel, comprising the steps of:

positioning said receive antenna in at least a local minimum of a known radiation pattern;

during transmission:
modulating a first information signal to be transmitted to produce a modulated signal;
processing said modulated signal to produce an amplified signal of a predetermined frequency;
splitting said amplified signal to produce a transmit signal and a reference signal; and
radiating said transmit signal in said known radiation pattern;

during reception, concurrent with said transmission:
picking up a radiated signal and producing in response thereto a picked-up signal;

inputting said picked-up signal and said reference signal to said RF canceller and using said RF canceller to cancel from said picked-up signal energy attributable to said transmit signal to produce a first self-cancelled signal;

selectively receiving a portion of said first self-cancelled signal of substantially said predetermined frequency and producing an intermediate signal;

inputting said intermediate signal and said modulated signal into said adaptive filter and using said adaptive filter to cancel from said intermediate signal further energy attributable to said transmit signal to produce a second self-cancelled signal; and demodulating said second self-cancelled signal to produce a second information signal.

14. In a full-duplex radio communications system comprising a first transceiver that transmits a first signal of a predetermined frequency and a second transceiver that transmits a second signal of substantially said predetermined frequency, the first signal being a desired signal of the second transceiver and the second signal being a desired signal of the first transceiver, wherein at a particular instant of time both the first signal and the second signal are being transmitted, a method of performing full-duplex communications over a single communications channel, comprising the steps of, at at least one of said first transceiver and said second transceiver:

during transmission:
  modulating one of said first and second signals to be transmitted to produce a modulated signal;
  processing said modulated signal to produce an amplified signal of a predetermined frequency;
  splitting said amplified signal to produce a transmit signal and a reference signal;
  distinguishing said transmit signal from a combined transmit/receive signal using a directional coupler; and
  radiating said transmit signal in a radiation pattern;

during reception, concurrent with said transmission:
  picking up a radiated signal and producing in response thereto a picked-up signal;
  distinguishing said picked-up signal from said combined transmit/receive signal using said directional coupler;
  inputting said picked-up signal and said reference signal to an RF canceller and using said RF canceller to cancel from said picked-up signal energy attributable to said transmit signal to produce an at least partially self-cancelled signal; selectively receiving a portion of said at least partially self-cancelled signal of substantially said predetermined frequency and producing an intermediate signal; and
  demodulating said intermediate signal to produce the other of said first and second signals.

15. In a radio communications transceiver having a transmit/receive antenna, a directional coupler, an analog RF canceller, and an adaptive filter, a method of performing full-duplex communications over a single communications channel, comprising the steps of:

during transmission:
  modulating a first information signal to be transmitted to produce a modulated signal;
  processing said modulated signal to produce an amplified signal of a predetermined frequency;
  splitting said amplified signal to produce a transmit signal and a reference signal;
  distinguishing said transmit signal from a combined transmit/receive signal using said directional coupler; and
  radiating said transmit signal in a radiation pattern;

during reception, concurrent with said transmission:
  picking up a radiated signal and producing in response thereto a picked-up signal;
  distinguishing said picked-up signal from said combined transmit/receive signal using said directional coupler;
  inputting said picked-up signal and said reference signal to said RF canceller and using said RF canceller to cancel from said picked-up signal energy attributable to said transmit signal to produce a first self-cancelled signal;
  selectively receiving a portion of said first self-cancelled signal of substantially said predetermined frequency;
  inputting said intermediate signal and said modulated signal into said adaptive filter and using said adaptive filter to cancel from said intermediate signal further energy attributable to said transmit signal to produce a second self-cancelled signal; and
  demodulating said second self-cancelled signal to produce a second information signal.

16. A full-duplex radio communications system comprising a first transceiver that transmits a first signal of a predetermined frequency and a second transceiver that transmits a second signal of substantially said predetermined frequency, the first signal being a desired signal of the second transceiver and the second signal being a desired signal of the first transceiver, wherein at a particular instant of time both the first signal and the second signal are being transmitted, at least one of the first transceiver and the second transceiver comprising:

a modulator responsive to one of said first and second signals to be transmitted for producing a modulated signal;

means responsive to said modulated signal for producing an amplified transmit signal of a predetermined frequency;

antenna means for radiating said transmit signal in a radiation pattern and for picking up a radiated signal and producing in response thereto a picked-up signal;

means responsive to said picked-up signal for selectively receiving a portion of said picked-up signal of substantially said predetermined frequency and for producing an intermediate signal;

means responsive to said intermediate signal and said modulated signal for cancelling from said intermediate signal further energy attributable to said transmit signal to produce a self-cancelled signal; and a demodulator responsive to said self-cancelled signal for producing the other of said first and second signals.

17. A full-duplex radio communications system comprising a first transceiver that transmits a first signal of a predetermined frequency and a second transceiver that transmits a second signal of substantially said predetermined frequency, the first signal being a desired signal of the second transceiver and the second signal being a desired signal of the first transceiver, wherein at a particular instant of time both the first signal and the second signal are being transmitted, at least one of the first transceiver and the second transceiver comprising:

a modulator responsive to one of said first and second signals to be transmitted for producing a modulated signal;

means responsive to said modulated signal for producing an amplified transmit signal of a predetermined frequency;

a transmit antenna coupled to said transmit signal for radiating said transmit signal in a radiation pattern;

a receive antenna for picking up a radiated signal and producing in response thereto a picked-up signal, said receive antenna being positioned in at least a local minimum of said radiation pattern;

means responsive to said picked-up signal for selectively receiving a portion of said picked-up signal of substantially said predetermined frequency and for producing an intermediate signal;

means responsive to said intermediate signal and said modulated signal for cancelling from said intermediate signal energy attributable to said transmit signal to produce a self-cancelled signal; and a demodulator responsive to said self-cancelled signal for producing the other of said first and second signals.

18. In a full-duplex radio communications system comprising a first transceiver that transmits a first signal of a predetermined frequency and a second transceiver that transmits a second signal of substantially said predetermined frequency, the first signal being a desired signal of the second transceiver and the second signal being a desired signal of the first transceiver, wherein at a particular instant of time both the first signal and the second signal are being transmitted, a method of performing full-duplex communications over a single communications channel, comprising the steps of, at at least one of said first transceiver and said second transceiver:

during transmission:
modulating one of said first and second signals to be transmitted to produce a modulated signal;
processing said modulated signal to produce an amplified transmit signal of a predetermined frequency; and
radiating said transmit signal;

during reception, concurrent with said transmission:
picking up a radiated signal and producing in response thereto a picked-up signal;
selectively receiving a portion of said picked-up signal of substantially said predetermined frequency and producing an intermediate signal;
inputting said intermediate signal and said modulated signal into an adaptive filter and using said adaptive filter to cancel from said intermediate signal energy attributable to said transmit signal to produce a self-cancelled signal; and
demodulating said self-cancelled signal to produce the other of said first and second signals.

19. In a full-duplex radio communications system comprising a first transceiver that transmits a first signal of a predetermined frequency and a second transceiver that transmits a second signal of substantially said predetermined frequency, the first signal being a desired signal of the second transceiver and the second signal being a desired signal of the first transceiver, wherein at a particular instant of time both the first signal and the second signal are being transmitted, a method of performing full-duplex communications over a single communications channel, comprising the steps of, at at least one of said first transceiver and said second transceiver:

positioning a receive antenna in at least a local minimum of a known radiation pattern;

during transmission:
modulating one of said first and second signals to be transmitted to produce a modulated signal;
processing said modulated signal to produce an amplified transmit signal of a predetermined frequency; and
radiating said transmit signal in said known radiation pattern;

during reception, concurrent with said transmission:
picking up a radiated signal and producing in response thereto a picked-up signal;
selectively receiving a portion of said picked-up signal of substantially said predetermined frequency and producing an intermediate signal;
inputting said intermediate signal and said modulated signal into an adaptive filter and using said adaptive filter to cancel from said intermediate signal energy attributable to said transmit signal to produce a self-cancelled signal; and
demodulating said self-cancelled signal to produce the other of said first and second signals.

\* \* \* \* \*